W. W. CRATE.
MOLD FOR MAKING ARTIFICIAL TEETH.
APPLICATION FILED FEB. 5, 1919.
1,370,191.
Patented Mar. 1, 1921.
2 SHEETS—SHEET 1.
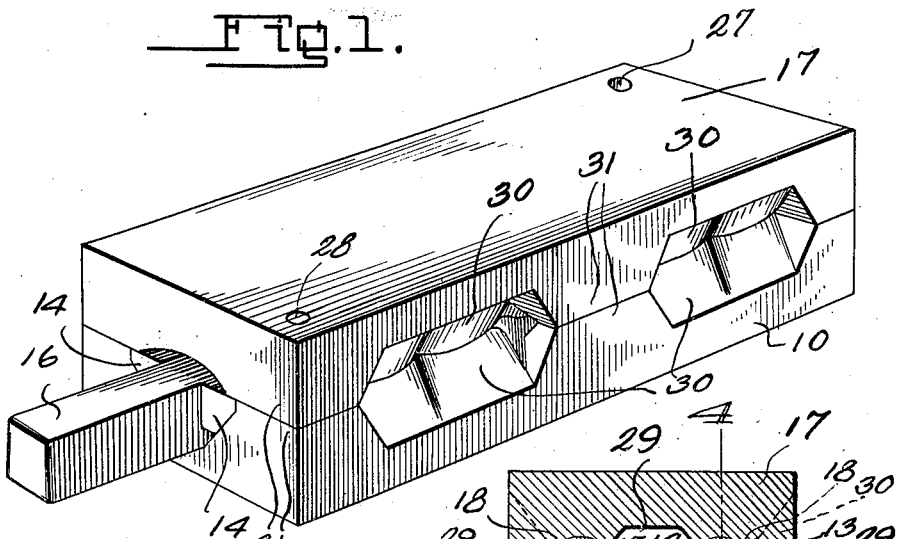
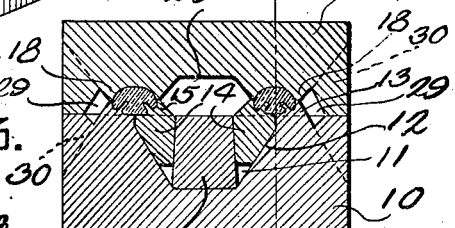
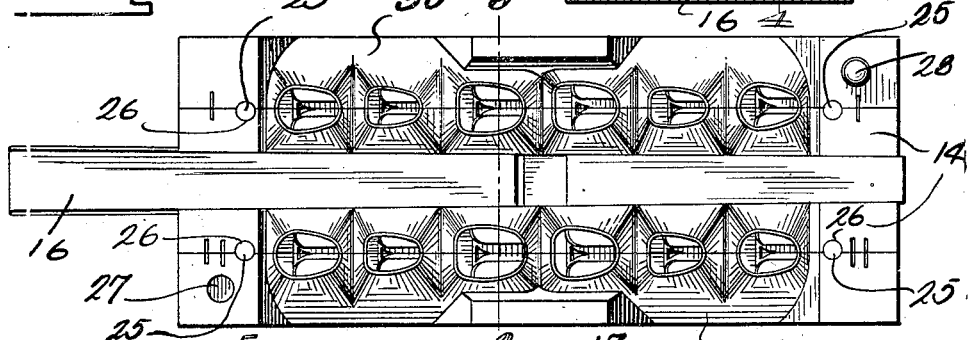
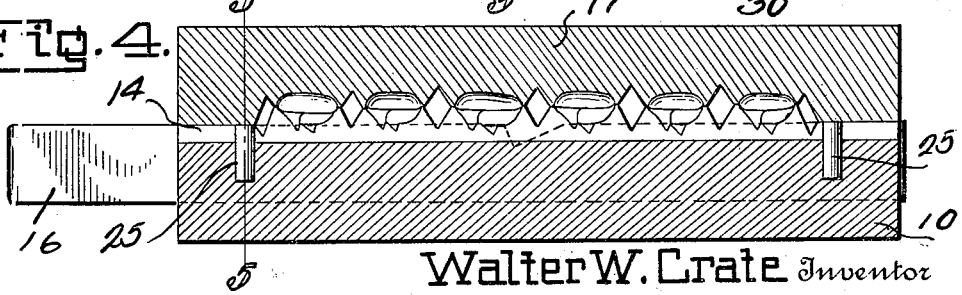
Walter W. Crate, Inventor W. W. CRATE.
MOLD FOR MAKING ARTIFICIAL TEETH.
APPLICATION FILED FEB. 5, 1919.
1,370,191.
Patented Mar. 1, 1921.
2 SHEETS—SHEET 2.
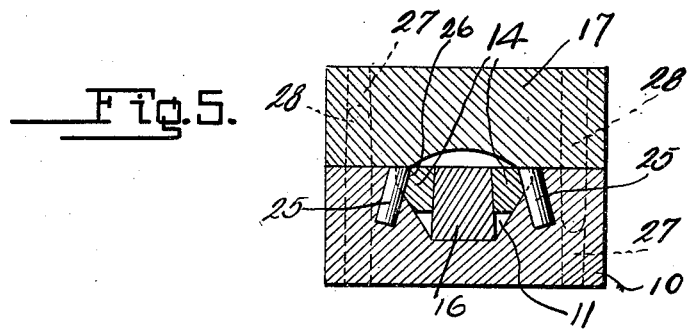
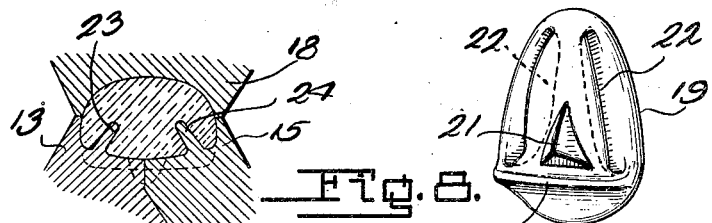
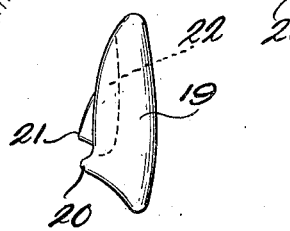
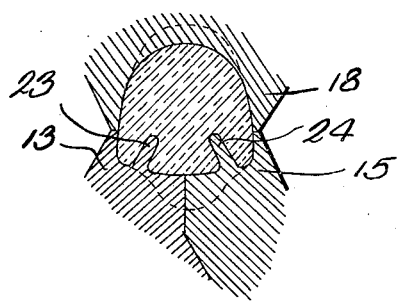
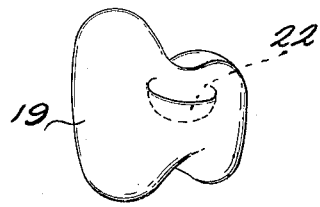
Walter W. Crate
Inventor

UNITED STATES PATENT OFFICE.

WALTER W. CRATE, OF CAMDEN, NEW JERSEY.

MOLD FOR MAKING ARTIFICIAL TEETH.

1,370,191. Specification of Letters Patent. Patented Mar. 1, 1921.

Application filed February 5, 1919. Serial No. 275,245.

*To all whom it may concern:*

Be it known that I, WALTER W. CRATE, a citizen of the United States, residing at Camden, in the county of Camden and State of New Jersey, have invented certain new and useful Improvements in Molds for Making Artificial Teeth, of which the following is a specification.

The present invention relates to the art of general manufacturing, and has particular reference to an improved mold for making artificial teeth.

An object of the present invention is to provide a mold of this character which is adapted particularly for making artificial teeth and which is so constructed that the parts thereof may be readily separated to remove the article after it has been formed and baked without injury to the article.

Another object of the present invention is to provide a mold adapted to inherently form in the body of an artificial tooth, attaching grooves of substantially undercut formation so that the grooves are inherently formed in the tooth body and do not require the cutting of the tooth body after the same has been molded; thus providing a tooth body with undercut attaching grooves, the walls of which are hardened and finished to the same degree as is the exterior surfaces of the artificial tooth.

The invention also aims at the provision of a mold of such construction that it can be operated while hot regardless of expansion, and which is reinforced against distortion and breaking incident to the pressure required to be placed upon the parts for compressing the plastic material which is placed into the cavity of the mold.

Broadly stated, the invention comprises a mold which is made of separable parts so formed and assembled that they are adapted to mold an artificial tooth body with undercut attaching grooves therein, and the parts being relatively movable one upon the other in directions to admit of the separation of the parts without injury to the tooth formed and without disturbing the relation of the finished walls of the tooth as the forming projections of the mold are removed from the grooves of the finished tooth body.

The above and various other advantages and objects of this invention will be in part understood and in part described from the following detailed description of the present preferred embodiment, the same being illustrated in the accompanying drawings, wherein:

Figure 1 is a perspective view of a complete mold constructed according to the present invention.

Fig. 2 is a top plan view of the lower portions of the mold assembled.

Fig. 3 is a transverse section taken through the mold, illustrating the plastic substance in two cavities of the mold, the mold in the present illustration being adapted to simultaneously form a plurality of artificial teeth.

Fig. 4 is a longitudinal vertical section taken through one side of the mold substantially in the plane indicated by the line 4—4 of Fig. 3, showing one row of molding cavities.

Fig. 5 is a transverse section taken through one end of the mold substantially in the plane indicated by the line 5—5 of Fig. 4, illustrating the guiding means which may be employed for holding the inner slidable sections of the mold in place.

Fig. 6 is a fragmentary enlarged section through the portion of the mold having a cavity therein and illustrating the plastic substance compressed and molded in the form of an artificial tooth.

Fig. 7 is a perspective view of the rear side of a tooth molded by means of the device of this invention.

Fig. 8 is an edge elevation of the same.

Fig. 9 is a view similar to Fig. 6, disclosing a slightly different form of molding cavity for a tooth of different shape.

Fig. 10 is a perspective view of an artificial tooth molded and formed by means of the mold disclosed in Fig. 9.

Referring to the drawings, the number 10 designates the base section of the mold which is of suitable exterior form and provided in its upper flat surface with a longitudinally extending channel 11 and provided at opposite sides of the channel with upwardly flaring inclined guiding surfaces 12 terminating at their upper end in mold projections 13. Arranged in the opposite sides of the channel 11 is a pair of relatively movable intermediate mold sections 14 which extend substantially throughout the length of the channel 11 and which are provided at their upper portions with upstanding mold projections 15. The outer opposite sides or faces of the intermediate mold section 14 are beveled or inclined complementally to the inclined lateral walls 12 of the channel 11 for the purpose of guiding the movable section 14 for movement in an upwardly diverging plane for a purpose which will hereinafter appear. The slidable sections 14 are raised and lowered upon the lateral walls 12 of the channel by means of a key or wedge 16 in the form of a bar tapering from one end to the other and having its enlarged end projecting beyond one end of the mold. The inner opposite faces of the mold section 14 are complementally formed with respect to the key 16 and are adapted to lie in the opposite sides thereof for spreading or moving the mold section 14 apart and upwardly on the inclined faces 12 when the key 16 is driven longitudinally into the mold. The upper face of the key 16 lies substantially in the upper face of the base section 10, while the lower side of the key 16 is adapted to rest and slide upon the bottom wall of the channel 11.

The mold is also provided with a top or face section 17 which conforms generally to the shape of the base section 10 and is adapted to be compressed downwardly thereagainst. The top section 17 is provided at points directly over or opposite to the mold projections 13 and 15 with detaching mold projections 18 which, in width, are equal to the combined widths of the registering mold projections 13 and 15. The said mold projections 13, 15 and 18 are adapted to register or be brought together when the parts of the mold are assembled and the projections are provided with complemental mold recesses or concavities adapted to form the cavity of the mold, each group of mold projections forming an independent cavity in the mold adapted to receive the plastic substance for molding it to the desired shape.

The top or face mold projections 18 are provided with relatively large concavities adapted to form the outer sides or faces of the teeth, and as shown in Figs. 6 and 9, may be of any desired depth in order to form a tooth of the desired character, and the lower mold projections 13 and 15 are provided with concavities of the desired shape and depth to form the back and edges of the tooth.

In Figs. 6, 7 and 10, there are disclosed forms of artificial teeth which may be formed by use of this mold, the concavities in the meeting projections 13, 15 and 18 of the mold being such as to provide a tooth body 19 having at its rear side or back a transverse ridge or rib 20 and an anchoring projection 21 of substantially prismatic form. It is also desirable to form inherently in the manufacture of the tooth, one or more attaching grooves 22 which are undercut and adapted to receive the supporting plastic body prior to its vulcanization. In order to thus inherently form the grooves 22 in the rear side and toward the edges of the tooth, the lowermost projections 13 and 15 are provided, in the concavities thereof, with groove forming projections 23 and 24 respectively, about which the plastic ceramic substance is adapted to be packed, the projections 23 and 24 extending in a direction such as to form the undercut attaching grooves 22 in the tooth body. It will be noted that the inclined opposite walls 12 of the channel 11 lie in planes substantially parallel to the planes of the projections 24 which are carried upon the intermediate relatively movable mold section 14 so that the movable sections are guided for movement in the planes of the projections and the latter are moved longitudinally from the grooves 22 formed by the projections in the tooth body. Such a construction or mold prevents damage to the tooth body as the mold sections are separated one from the other. The construction also obviates the necessity of cutting or otherwise forming the grooves in the back of the teeth after the latter have been molded and registered. The opposed walls of the grooves 22 are given the finish and hardness of the exterior surfaces of the teeth as the latter are originally molded and shaped to form as the tooth is made.

The key 16 is longitudinally movable in the channel 11 and it slides against the movable mold section 14. In order to maintain the section 14 from shifting longitudinally and thus moving the concavity of the said section 14 and the adjacent lower section 13 out of alinement, stop pins 25 may be employed and secured in suitable manner in the base section 10 of the mold with the upper portions of the pins exposed in the channel 11 sufficiently to engage in correspondingly formed vertical grooves 26 formed in the movable mold section 14. The sliding pins 25 thus permit the movable sections 14 to freely slide upon the inclined faces 12 of the base section 10 and at the same time prevent the longitudinal shifting of the movable section 14 out of alinement. The complemental projections or mold sections 13, 15 and 18, may be provided with any desired number of concavities, as shown in Fig. 2 for the simultaneous formation of any desired number of artificial teeth. As shown in Fig. 1 and in dotted lines in Fig. 5, the base section 10 and the top section 17 may be provided with complemental openings and pins 27 and 28 for maintaining the top section 17 in true alinement upon the base section 10 and holding the sections from relative shifting during compression of the mold.

It will be noted from the drawings that the base and top sections of the mold are provided with ventilating recesses 29 at opposite sides of the complemental mold projections 13, 15 and 18. This provides for equal heating of the parts of the mold and provides passages for excess plastic material which may be excluded from the mold cavities during the compression of the sections. It will be noticed that to further this result, the base section 10 and the top section 17 are provided at opposite sides of the mold, with exterior recesses 30 which open into the interior recesses 29 and provide air vents for the mold and also permit the passing off of the excess plastic material.

In using the mold, the top section 17 is removed and the key 16 is adjusted to raise the movable section 14 into position to form the lower portion of the mold cavity. The section 14 may be lifted from the mold if desired and independently packed with the plastic ceramic material. The material is packed in the concavities of the mold projections 13; and in the mold projections 18 of the top sections 17. Preferably, enamel is packed into the concavities of the top section 17 while a suitable body substance is placed in the concavities of the lower mold projections 13, and 15. The enamel substance, by virtue of its transparency is adapted to blend with coloring which may be placed in the filler substance so that the desired natural effect in artificial teeth may be obtained.

After the respective concavities of the mold section have been filled with the plastic substance, the key 16 is inserted in the channel 11 and the top 17 is fitted into place. As the key 16 is driven in, the movable mold sections 14 are raised upon the inclined guiding walls 12 and suitable pressure is applied to the parts for molding and forming the plastic substance to the concavities and about the groove forming projections 23 and 24. After the one or more teeth have been formed in the mold, the same is baked at the desired temperature for producing the desired hardness and finish to the product.

In separating the parts of the mold, the top section 17 is first removed to expose the face of the one or more teeth. The key 16 is now retracted to release the removable intermediate mold sections 14, which latter are adapted to slide down upon the guiding surfaces 12 and, if not of sufficient weight to be released from the molded teeth, slight jarring on the mold body will readily produce the result. Inclined guiding faces 12 guide the movable sections 14 into the plane of their respective projections so that the latter are moved longitudinally from the groove without exerting any lateral strain upon the walls of the groove and thus preventing breaking or injury to the tooth formed. The key 16 and movable section 14 are taken out of the base section 10 and the latter is arranged in suitable position, such as on one side, and given a slight jar for dislodging the molded teeth from the mold projections 13 of the base section. It will be noted that the molded teeth are free to fall from the base section into the plane of the projection of the base section so that no injury can result by lateral pressure of the projection against the walls of the groove.

In the structure of mold above described, the base and top sections 10 and 17 are not only ventilated at their meeting positions, but also the sections are braced and supported against each other from bending and warping when subjected to pressure and heat by virtue of the formation of the registering rests or abutments 31 carried by the sections (lateral to recesses 11 and 29) at the ends of the mold; and between the recesses 30 in the sides of the mold, the registering rests between recesses 30 being novel; particularly preventing the mold bending in the middle under the press.

By use of this mold a tooth is thus formed which inherently has therein the attaching undercut grooves, so that it is unnecessary to subsequently cut or otherwise work upon the body of the tooth to produce the desired undercut grooves. The tooth body is thus not only reinforced by the inherent forming of these undercut grooves, but by molding a great saving of labor is afforded. The registering rests in the middle of the mold also save a great amount of repair to the registering edges of the concavities which form the tooth. The free contacting surface construction of the mold also makes it practicable to open and remove the baked teeth while the mold is hot, thus saving time lost otherwise through waiting for the expanded metal in the mold to cool. Another useful feature of the mold is that a double line of teeth are moldable with one key-bar, thus again saving labor by doubling the production in one operation.

I claim:

1. In a mold, the combination of a pair of relatively slidable sections operable one upon the other to open and close the mold, and wedging means for holding the sections in position for molding and adapted to be released for permitting the sliding of the sections to open the mold.

2. In a mold, the combination of a plurality of complemental sections having cavities therein forming a molding chamber, one section being slidable against the side of an adjacent section and guided thereby to prevent injury to the molded article.

3. In a mold, the combination of three or more separable main sections having cavities at their meeting portions, and with at least two of the sections having projections in their respective cavities inclined toward the cavity of the remaining section, one of the sections with a projection being slidable at one side against the side of the other section having a projection and the plane of contact between the sections being parallel to the plane of one of the projections.

4. In a mold, the combination of superposed sections, said sections having registering projecting portions with complemental cavities therein to form the mold chamber, the said projecting portions forming air passages thereabout to prevent the undue heating of the mold.

5. In a mold, the combination of a pair of relatively slidable base sections with their contacting faces in a plane inclined from the vertical and having registering concavities in their upper portions, said sections also having upwardly converging projections with one projection parallel with said plane of the contacting faces of the sections to admit longitudinal removal of the projection from an article molded, and a removable top section having a complemental cavity therein.

6. In a mold, the combination of a pair of relatively slidable sections with their contacting faces lying in a plane inclined from the vertical and having converging projections in the cavities thereof, and a key engaging one of the sections and having an inclined surface for moving the section in the direction of its projection.

7. In a mold, the combination of a pair of sections having inclined contacting faces to admit the sliding of one section obliquely upon the other and having projections in the cavities thereof with the projection of one of the sections extending in the direction of movement of the section, and a tapering key engaging said section for supporting and releasing the same.

8. In a mold, the combination of a base section having a central longitudinal recess with flaring walls, slidable sections arranged against the walls, a key movable longitudinally disposed in the recess and bearing against the slidable sections for raising and lowering the same, and a top section overlying the base and slidable sections and adapted to be removed to expose the same, all of said sections having complemental cavities therein and the slidable sections having projections extending into the cavities in the direction of movement of the slidable sections.

9. In a mold, the combination of meeting sections provided with complemental cavity portions and ventilating recesses about said portions, the sections also having registering rests spaced within the recesses to interbrace the sections against bending under pressure.

WALTER W. CRATE.